No. 808,234. PATENTED DEC. 26, 1905.
W. M. GOOCH.
EMERGENCY BRAKE.
APPLICATION FILED MAR. 27, 1905.
Fig. 1.
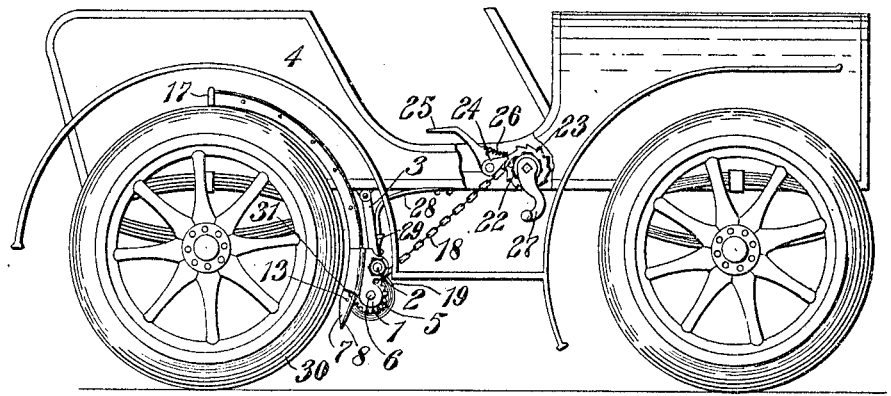
Fig. 2.
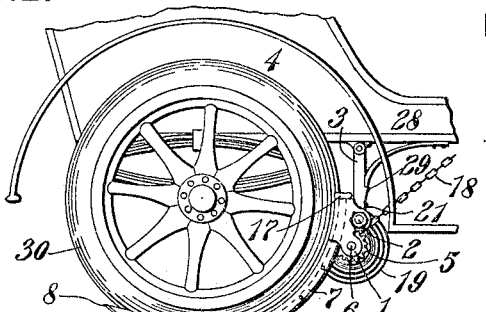
Fig. 7.
Fig. 3.
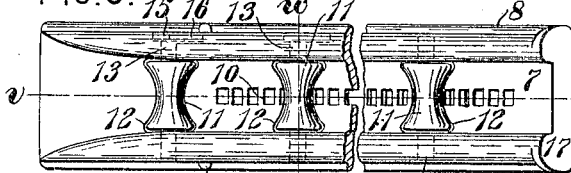
Fig. 8.
Fig. 4.
Fig. 9.
Fig. 5. Fig. 6.
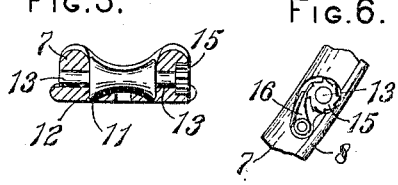
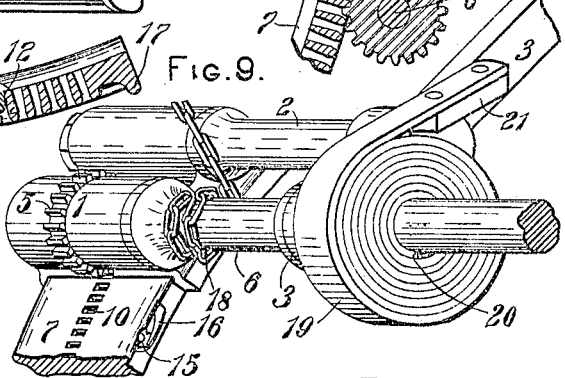
Witnesses:
Clarence L. Perdew
Ada Burnett
Inventor
Walter M. Gooch
By James K. Ramsey
Attorney.

UNITED STATES PATENT OFFICE.

WALTER M. GOOCH, OF DAYTON, KENTUCKY.

EMERGENCY-BRAKE.

No. 808,234.     Specification of Letters Patent.     Patented Dec. 26, 1905.

Application filed March 27, 1905. Serial No. 252,136.

*To all whom it may concern:*

Be it known that I, WALTER M. GOOCH, a citizen of the United States, residing at Dayton, in the county of Campbell and State of Kentucky, have invented certain new and useful Improvements in Emergency-Brakes, of which the following is a specification.

My invention relates to means for quickly stopping a vehicle.

The object of my invention is to provide a device of this character that will operate effectively with the least damage to the vehicle.

My invention consists in a member placed adjacent a wheel of a vehicle adapted to be interposed between the wheel and the surface over which the vehicle runs, means for holding and guiding the member, means for interposing the member between said wheel and said surface, and means for releasing the member.

My invention also consists in parts and in the details and arrangement of parts, as will hereinafter be more fully described and claimed.

In the drawings, Figure 1 is a side elevation of a vehicle having my invention applied thereto and held in its normal position. Fig. 2 is a similar view of part of a vehicle, showing my invention in its position after it has acted. Fig. 3 is a plan view of the end portions of the member. Fig. 4 is a section on the line $vv$ of Fig. 3. Fig. 5 is a section on the line $ww$ of Fig. 3. Fig. 6 is a side elevation of a portion of the member, showing the ratchet. Fig. 7 is a plan view of the head and portions of the shafts and chain. Fig. 8 is a section on the line $xx$ of Fig. 7. Fig. 9 is a perspective view of a portion of my invention, showing more clearly the coiled spring.

The construction of my improved emergency-brake is as follows: The head 1 is hung, by means of the stud 2 and link 3, to the body 4 of the vehicle, the link 3 being pivotally connected to the bed. A toothed wheel 5 is rigidly mounted on the shaft 6, which is journaled in the head 1. The member 7, preferably formed in the shape of a segment, has flanges 8 fitting into the ways 9 in the head 1 and is guided thereby. The toothed wheel 5 meshes with the rack 10 in the member 7. Preferably the spaces between the teeth of the rack 10 extend through the member 7, so that the rack will not become clogged. Spool-shaped rollers 11 are mounted within the recesses 12 in the member 7 and turn with their shafts 13. Some of the rollers 11, those near the lower or pointed end of the member 7, are provided with ratchet-wheels 15 and pawls 16, so that they can be revolved in but one direction. The member 7 is trough-shaped and is provided with the head 17 to prevent it from slipping through the head 1 when brought into use. Preferably the shaft 6 has a bearing in the lower end of the link 3, and between the link 3 and the head 1 it has the chain 18 attached, as is best shown in Fig. 9. On the opposite side of the link 3 the flat spiral spring 19 is attached by one of its ends 20 to the shaft 6, and its other end is attached to the lug 21 on the brace 3. At a convenient place on the vehicle is placed the windlass 22, having the ratchet-wheel 23. The pawl 24 is rigidly attached to the treadle 25 and is held in engagement with the ratchet-wheel 23 by means of the spring 26. The chain 18 is attached to the windlass, so that it may be wound thereon while unwinding from the shaft 6. Preferably the crank 27 of the windlass is removable therefrom. A spring 28, rigidly attached to the body 4, bears against the lug 29 on the link 3 and tends to force it toward the wheel 30 of the vehicle, but is normally prevented from doing so by the tension of the chain 18, held by means of a ratchet and pawl 23 and 24.

To operate my improved emergency-brake when held in position shown in Fig. 1, the treadle 25 is depressed, disengaging the pawl 24 from the ratchet-wheel 23. The spring 28 will now act upon the link 3 and force the parts supported by the link toward the wheel 30, while the flat spiral spring 19 will uncoil, revolving the shaft 6, winding the chain 18 onto the shaft 6, and revolving the toothed wheel 5. The member 7 will thus be forced downward by means of the toothed wheel 5 acting upon the rack 10. When the tapered end of the member 7 reaches the surface upon which the vehicle is running, the wheel 30 will mount it. The member 7 will continue to move until its head 17 engages the upper part of the head 1. The wheel 30, however, is still free to revolve as it rests upon the rollers 11 in the member, so that there is no rubbing friction between the member and the wheel, as with an ordinary brake-shoe; but the vehicle is stopped by the friction of the member with the surface upon which the vehicle has been running. When it is desired to reset the emergency-brake, the vehicle is backed off the member 7, the chain 18 is rewound onto the drum 22 by means of the crank 27 and unwound from the shaft 6, revolving it, so that the member 7 is raised to its normal position by means of the toothed wheel 5. When the member 7 has reached its normal position, a lug 31 thereon will bear against the lower side of the head 1, preventing the member from being raised higher and preventing the toothed wheel 5 and shaft 6 from further revolving, so that any further turning of the windlass 22 will act to draw the member 7 away from the wheel 30 against the pressure of the spring 28. The pawl 24 will now engage the ratchet-wheel 23, holding the windlass and other parts ready for another occasion.

Some of the spool-shaped rollers 11 are provided with ratchets, as above described, so that when it is desired to back a self-driven vehicle off the member these rollers will not revolve, but will provide the necessary reaction to cause the wheel to roll off the member 7. My emergency-brake is thus especially adapted to automobiles, and another advantage is that the brake will not injure the tire, thus adapting it for use with any vehicle having rubber tires. When my improved brake is applied to both rear wheels simultaneously, it does not act to throw the vehicle out of its course. This is of great advantage where the course is narrow and where great damage might result should the vehicle leave it. As I have shown my device, when the windlass 22 is released three forces act upon the member 7—gravitation, the coiled spring 19, and, since the member 7 is forced against the tire of the wheel 30 by means of the spring 28, the friction between the member 7 and the tire. In some cases it may be found desirable to dispense with the coiled spring 19 or the spring 28, or both. However, I prefer to take advantage of the three forces mentioned, making the brake more nearly instantaneous in its action than if one or two were dispensed with.

It will be seen that many modifications of the construction may be made without departing from the scope and spirit of my invention. Therefore I do not wish to be understood as limiting myself to the precise construction herein shown and described; but

What I claim as new, and desire to secure by Letters Patent, is—

1. In an emergency-brake, a head suitably mounted a member movably secured thereto adjacent a wheel, a rack on said member, a toothed wheel adapted to engage said rack, a shaft on which said toothed wheel is mounted, a chain secured to said shaft and adapted to be wound thereon and means for unwinding said chain.

2. In an emergency-brake, a head suitably mounted a member movably secured thereto adjacent a wheel and having a rack, a toothed wheel adapted to engage said rack, a shaft on which said toothed wheel is mounted, a chain secured to said shaft and adapted to be wound thereon, a windlass for unwinding the chain from the shaft, means for holding the chain in such unwound position, and means for releasing the windlass.

3. In an emergency-brake, a head suitably mounted, a member secured thereto adjacent a wheel and having a rack, a toothed wheel adapted to engage said rack, a shaft on which said toothed wheel is mounted, a chain secured to said shaft and adapted to be wound thereon, a windlass for unwinding the chain from the shaft, a ratchet-wheel on said windlass, a pawl adapted to engage said ratchet-wheel, a treadle and a spring adapted to hold said pawl in engagement with said ratchet-wheel.

4. In an emergency-brake, a head suitably mounted, a member movably secured thereto adjacent a wheel and having a rack formed therein with spaces extending therethrough between the rack-teeth, a toothed wheel adapted to engage said rack, and means for turning said toothed wheel.

WALTER M. GOOCH.

Witnesses:
 JAMES N. RAMSEY,
 CLARENCE L. PERDEW.